Patented July 4, 1944

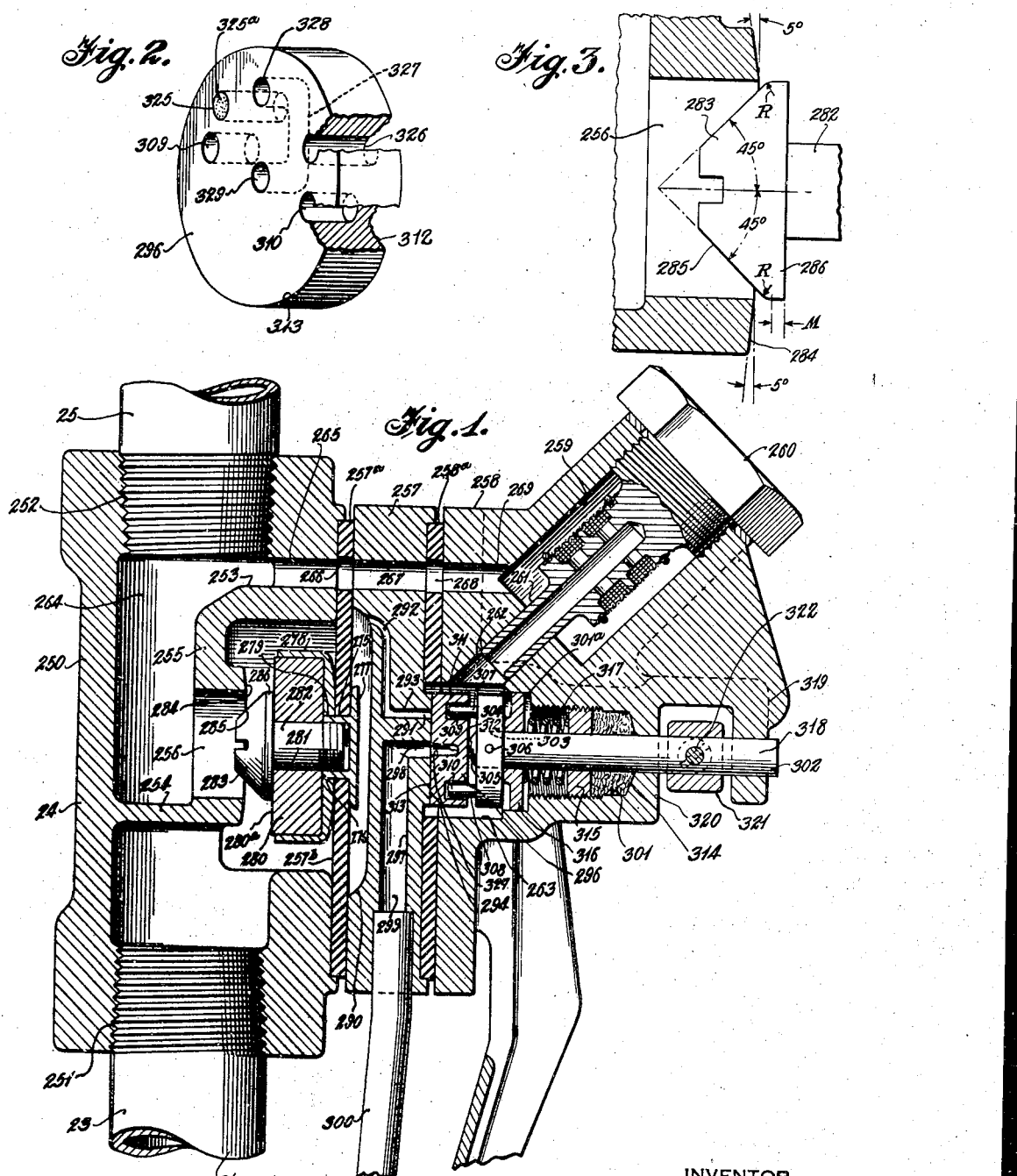

2,352,628

UNITED STATES PATENT OFFICE 2,352,628

VALVE

Donald G. Griswold, Alhambra, Calif., assignor to Clayton Manufacturing Company, Alhambra, Calif.

Original application May 17, 1939, Serial No. 274,288, now Patent No. 2,243,815, dated May 27, 1941. Divided and this application March 11, 1941, Serial No. 382,801

2 Claims. (Cl. 137—139)

The present invention relates to valve means and more particularly to pilot controlled valve means.

The principal object of the invention is to provide quiet operating valve means for controlling the flow of fluid, and which valve means eliminates line shock, chatter and vibration.

Another object of the invention is to provide valve means including a main diaphragm valve for controlling the flow of fluid under pressure, and a pilot valve actuable by a relatively small force irrespective of the size of the valve or the pressure of the fluid flowing therethrough.

Other and further objects of the invention will be apparent from the following description taken in conjunction with the accompanying drawing, in which:

Figure 1 is an enlarged longitudinal sectional view of a main valve and a pilot valve that may be float controlled;

Figure 2 is a perspective view, partially in section, of the pilot valve disc employed in the pilot valve shown in Fig. 1; and Figure 3 is a fragmentary view drawn to exaggerated scale showing specific details of the valve seat of the main valve and the head of the screw which retains the valve washer in assembled relation with the diaphragm.

Referring now to Figure 1 the main valve is generally indicated by the numeral 24. This valve is of the diaphragm type and comprises a main body portion 250 having a threaded opening 251 in which the upper end 23 of a pipe 21 (the lower end of which may communicate with a source of liquid under atmospheric pressure such as an open tank, not shown) is received and a second threaded opening 252 in which one end of a pipe 25 is received. Intermediate the openings 251 and 252 are transverse partitions 253 and 254 connected by a longitudinal web 255. The web 255 is provided with an opening 256 whereby the passage of fluid may be permitted from the pipe 21 to the pipe 25, and vice versa, when said opening is unobstructed. The valve 24 comprises valve sections 257 and 258 in addition to the body portion 250. A diaphragm 257ᵃ is interposed between the body 250 and the section 257 and a gasket 258ᵃ is interposed between the sections 257 and 258.

The valve section 258 is provided with a chamber 259 in which is mounted a strainer plug 260. The plug 260 is provided with a hollow stem 261 which extends into an angular passageway 262 in the valve section 258. The section 258 is further provided with a circular chamber 263 into which the passageway 262 opens.

As is best shown in Figure 1, a continuous passageway is provided between a chamber 264 in the upper part of the body 250 and the chamber 259 in the valve section 258. This passageway comprises an opening 265 in the body 250, an opening 266 in the diaphragm 257ᵃ, an opening 267 in the valve section 257, an opening 268 in the gasket 258ᵃ, and an opening 269 in the valve section 258. It will be clear from the foregoing that any positive pressure condition existing in the chamber 264 will be communicated to the chamber 263 through the continuous passageway 265—269; the hollow stem 261 of the strainer plug 260; and the passageway 262.

The diaphragm 257ᵃ is provided with a central aperture 275 for the reception of a nut having an internally threaded shank 276 extending axially from a substantially circular head 277 including an annular flange portion engaging one side of said diaphragm. A metallic cup shaped element 278 is provided with an aperture 279 of a size adapted to snugly receive the shank 276. The hollow portion of the cup member 278 is formed to receive an annular packing element 280. The packing element 280 is provided with an axial opening 281 and a bolt 282 extends through said opening and has a threaded stem received in the shank 276. The bolt 282 serves to clamp the diaphragm between the head 277 and the cup 278 and at the same time to maintain the packing 280 assembled within said cup. The exposed face 280ᵃ of the packing 280 is adapted to be held against an annular tapered seat 284 formed on the web 255, and when so held, all flow of fluid through the valve in either direction is prevented.

A very important feature of the valve 24 is the provision of means conducive to quiet operation and gradual cutting-off of the flow through the valve without chatter. The above results are attained by providing the bolt 282 with a head 283 having an annular portion 285 tapered on substantially a 45° angle and a substantially cylindrical portion 286 of a desirable width M; the tapered portion 285 and the cylindrical portion 286 being connected by a curved portion struck on a suitable radius R, as indicated in the exaggerated Figure 3. The rounded surface between the tapered portion and the cylindrical portion cooperates with the edge of the valve seat 284 and serves to gradually cut off the flow of fluid through the valve seat opening 256 and in this manner whistling and squealing noises otherwise incidental to flow cut-off are eliminated. The operation of the valve is further improved by forming the annular valve seat 284 with a 5° taper.

The intermediate valve section 257 is provided with a shallow circular recess 290 adjacent one side of the diaphragm 257ᵃ. The chamber 290 receives the nut head 277 and further functions as a receiver for pressure fluid intended to actuate the diaphragm 257ᵃ to close the valve. A generally L-shaped passageway 291 is formed in the valve section 257. One end 292 of said passageway communicates with the upper portion of the chamber 290. This arrangement is important because it permits exhausting of the chamber at the highest point thereof and thereby precludes the formation of an air pocket in the chamber 290 which would tend to make the valve chatter. The opposite end 293 of the passageway 291 opens into the face of a boss 294. The face of the boss 294 is made smooth and is thus adapted to provide a seat for a disc type pilot valve 296. The valve section 257 is further provided with an L-shaped passageway 297, one leg 298 of which is horizontal and opens into the face of the boss 294 and the other leg 299 of which is vertical and communicates with an exhaust or drain tube 300 open to the atmosphere.

The valve section 258 is further provided with chambers 301 and 301ᵃ adjacent to the chamber 263. One end 303 of the shaft 302 extends through a drive member 304 for the pilot valve 296. A pin 306 secures the drive member 304 to the shaft 302. The end 303 of the shaft is rounded as indicated at 305 and engages the pilot valve 296 as shown. The drive member 304 is provided with longitudinally extending pins 307 and 308 adapted to project into recesses 309 and 310 extending part way through the pilot valve disc 296. The pilot valve disc 296 is positioned in the chamber 263 so that a face 312 thereof is adjacent the rounded portion 305 of the shaft 302 and its opposite face 313 mates with the face of the boss 294.

Suitable packing 314 is disposed in the chamber 301 in surrounding relation to the shaft 302 and seals the shaft against leakage of pressure fluid from the chamber 263. The packing 314 is compressed by a washer 315 slidably mounted on the shaft 302 and threaded into the wall of chamber 301. A second washer 316 is arranged on said shaft in the chamber 301ᵃ adjacent the driving member 304. This second washer serves as a bearing support for one end of the shaft 302. A spring 317 surrounds the shaft 302 between the washers 315 and 316 and urges the pilot valve disc 296 against its seat.

The outer end 318 of the shaft 302 is supported in a web 319 depending from the valve section 258. The portion of said valve section defining the packing chamber 301 terminates in a wall 320 spaced from the web 319 to provide an opening for the reception of an actuating arm 321. The arm 321 is secured to the shaft 302 by a screw 322 whose shank 322ᵃ extends therethrough. This arrangement assures proper assembly or indexing of the actuating arm on the shaft 302.

It will be noted from Figure 1 that the periphery of the pilot valve disc 296 is spaced from the walls of the chamber 263 and that the pins 307 and 308 fit with clearance in the recesses 309 and 310. This arrangement permits a more or less flexible or non-rigid drive between the drive member 304 and the pilot valve disc 296; the disc being free to pivot somewhat upon the rounded end 305 of the shaft 302 to accurately align itself at all times upon the boss 294.

The pressure of the fluid in the chamber 263 aids in maintaining the pilot valve disc 296 in engagement with its seat. However, the spring 317 maintains such engagement in the absence of pressure fluid in said chamber and thereby precludes the entry of dirt or foreign matter between the valve disc and its seat.

The pilot valve disc 296 is illustrated in perspective in Figure 2. As is here shown, the same is provided with through ports 325 and 326, respectively, each port being spaced the same distance from the axis of the disc. The pilot valve disc 296 is further provided with a U-shaped passageway generally indicated by the numeral 327 and comprising leg portions 328 and 329. The leg portion 329 is arranged on the axis of the disc and the leg 328 is spaced the same distance from the axis as the ports 325 and 326.

It will be noted from Figure 1 that the leg 329 is in alignment with the portion 298 of the exhaust passageway 297. It is to be understood that the end 293 of the passageway 291 is spaced from the portion 298 a distance equal to the spacing of the ports 325 and 326 from the leg 329, whereby either of the ports 325 or 326 and the leg 328 may be brought into registration with the portion 293 to effect closing and opening of the valve in a manner which will be described hereinafter.

A suitable linkage, including a float in a tank, associated with the arm 321 for operating the pilot valve shaft 302 through said arm is shown in detail in Figures 22, 23, 24 and 25 of my Patent 2,243,815 which issued on application Serial No. 274,288, filed May 17, 1939, of which the instant application is a division.

It is to be understood that when the arm 321 is in its upper angular position, the passageway 326 in the pilot valve disc 296 is in registration with the passageway 291 in the valve section 257. Hence, the pressure condition in the chamber 263 will be communicated through the port 326 and passage 291 to the diaphragm chamber 290. A partial vacuum condition in the chamber 264 will provide a like condition in the chamber 290. When an open tank, not shown, is associated with the pipe 21, the higher or approximately atmospheric pressure on the fluid in the pipe 21 acts against the lower portion 257ᵇ of the diaphragm 257ᵃ to displace the annular member 280 from the seat 284 and open the valve to permit the flow of fluid from said tank through the pipe 21, valve 24 and into pipe 25.

So long as liquid continues to flow through the valve 24, the level in the tank, not shown, will be lowered and the float, not shown herein but disclosed in my patent supra, will descend with said level and the arm 321 will be angularly rotated counterclockwise. The angular movement of the arm 321 imparts rotation to the shaft 302 and the pilot valve disc 296 carried thereby so that the port 326 is moved out of alignment with the passageway 291. In fact, the pilot disc herein disclosed is turned through an angle of approximately 60° by the movement of the arm 321 from one extreme angular position to the other. However, this angle of movement is not critical and may be varied as desired provided the ports 325 and 326 are correspondingly reallocated. When the arm 321 reaches its lower angular position, the pilot valve will have been turned to a position such that the U-shaped passageway 327 registers with the passageways 291 and 298 in the valve section 257; the legs 328 and 329 of said U-shaped passageway being respectively aligned with the passageways 291 and 298. Inasmuch as the passageway 298 is open to the atmosphere through tube 300, the diaphragm chamber 290 will be placed under atmospheric pressure. The above rotation of the pilot disc 296 occurs, of course, while suction is effective in the pipe 25. Therefore, a negative pressure or suction will exist in the chamber 264 and the diaphragm 257ᵃ will be actuated by atmospheric pressure to close the valve and cut off the flow of liquid through the valve 24 and the pipe 21.

Assuming the conditions in the pipe 25 have changed from suction to hydraulic pressure as the result of liquid flowing through said pipe into the valve 24, pressure will then build up in the chamber 264 in the valve 24. When this pressure exceeds atmospheric, the member 280 will be unseated and the water will readily pass through the passage 256 in the valve seat 284, enter the pipe 21, and discharge therefrom into the tank, not shown. Upon continued discharge, the level in said tank will gradually rise and the float, not shown, will return the arm 321 to its original angular position. Such movement of the arm 321 will necessarily rotate the shaft 302 and the pilot disc 296 and return the same to their original position.

The initial return rotation of the pilot disc 296 causes the leg 328 of the U-shaped passage 327 to become disaligned with the passage 291. This cuts the chamber 290 off from the atmosphere. However, since the pressure in said chamber is not changed the valve 24 remains open and does not close until the pilot disc 296 approaches its final position. By the time that the arm 321 has been moved into its upper angular position, the port 326 will have been brought into registration with the port 291 and then the pressure of the fluid in chamber 264 will be communicated to the chamber 290 and the diaphragm 257ᵃ will be positively actuated to gradually cut off the flow through the passage 256 in the valve 24. Thus, the pressure of the fluid flowing through the valve 24 is itself utilized to actuate the diaphragm 257ᵃ to close the valve.

In the foregoing description of the operation of the valve, no function has been ascribed to the port 325 of the pilot disc 296. In practice, this port is packed with a waterproof grease 325ᵃ to lubricate the valve disc 296 in its travel over the valve seat 294. Any pressure fluid in the chamber 263 tends to force the grease against the valve seat 294 and thereby maintains a sufficient film of grease on said seat to keep it properly lubricated.

It will be understood that the valve disclosed herein is not limited to use with the liquid in pipe 21 subject to atmospheric pressure nor with the pipe 25 alternately subject to suction and pressure, inasmuch as such conditions serve merely to illustrate one unique operative installation of the valve. It will also be understood that the pilot valve arm 321 is not limited to actuation by a float mechanism.

It will be further understood that various changes in the details of construction of the main valve and pilot valve disclosed herein may be made without departing from the spirit of the invention or the scope of the annexed claims.

I claim:

1. A valve comprising, a body having inlet and outlet openings; a passageway in said body between said openings; an annular seat surrounding said passageway, said seat being beveled outwardly from the inner edge of said passageway on an angle of about 5°; a pressure operated diaphragm for controlling the flow of fluid between said openings; a substantially flat valve disc carried by said diaphragm and adapted to engage the inner edge of said beveled seat; and means securing said valve disc to said diaphragm including a bolt member and a nut, said bolt member having a head and a threaded stem extending through said valve disc, said nut including an imperforate circular head portion and a tubular shank of relatively smaller diameter extending from one side of said circular head portion through said diaphragm and being threadedly secured to said bolt stem and enclosing the end of said bolt stem with the portion of the underside of said circular head outwardly of said tubular shank engaging one side of said diaphragm, said bolt head having an annular portion beveled on an angle of about 45° and adapted to enter said passageway, a substantially cylindrical portion of only slightly less diameter than the diameter of said passageway, and a curved portion interconnecting said annular beveled portion and said substantially cylindrical portion, the beveled portion of said valve seat cooperating with said valve disc to provide a leak-proof seal, and the beveled and curved portions on the head of said bolt member cooperating with the adjacent wall of said passageway to gradually cut off flow through said passageway to thereby eliminate noise and chattering of the valve disc during flow cut-off.

2. A valve comprising: a body having inlet and outlet openings; a passageway in said body between said openings; an annular seat surrounding said passageway, said seat being beveled outwardly from the inner edge of said passageway; a pressure operated diaphragm for controlling the flow of fluid between said openings; a cup member having the base thereof engaging said diaphragm, said base having a central aperture; a substantially flat valve disc seated in said cup member and adapted to engage the inner edge of said beveled seat; and means securing said cup member and valve disc to said diaphragm, including a bolt member and a nut, said bolt member including a head and having a threaded stem extending through said valve disc and said aperture of said cup, said nut including an imperforate circular head portion and a tubular shank of relatively smaller diameter extending from one side of said circular head portion through said diaphragm and said aperture of said cup and being threadedly secured to said bolt stem and enclosing the end of said bolt stem with the portion of the underside of said circular head outwardly of said tubular shank engaging one side of said diaphragm, said bolt head having an annular beveled portion adapted to enter said passageway, a substantially cylindrical portion of only slightly less diameter than the diameter of said passageway and a curved portion interconnecting said annular beveled portion and said substantially cylindrical portion, the beveled portion of said valve seat cooperating with said valve disc to provide a leak-proof seal and the cylindrical beveled and curved portions on the head of said bolt member cooperating with the adjacent wall of said passageway to gradually cut off flow through said passageway to thereby eliminate noise and chattering of the valve disc during flow cut-off.

DONALD G. GRISWOLD.